United States Patent [19]
Caputo

[11] Patent Number: 5,837,753
[45] Date of Patent: Nov. 17, 1998

[54] STABLE OIL-IN-WATER INK EMULSIONS BASED UPON WATER-REDUCIBLE SOLVENT DYES FOR INK-JET PRINTERS AND FELT-TIP AND ROLLER-BALL PENS

[75] Inventor: Peter A. Caputo, South Orange, N.J.

[73] Assignee: Morton International, Inc., Chicago, Ill.

[21] Appl. No.: 690,713

[22] Filed: Jul. 31, 1996

[51] Int. Cl.⁶ ...................................................... C09D 5/00
[52] U.S. Cl. ................................................................ 523/161
[58] Field of Search ............................................. 523/161

[56] References Cited

U.S. PATENT DOCUMENTS

| | | | |
|---|---|---|---|
| 3,854,969 | 12/1974 | Zwahlen | 106/176 |
| 3,951,598 | 4/1976 | Arashi et al. | 8/169 |
| 5,092,907 | 3/1992 | Riblet et al. | 8/645 |
| 5,114,479 | 5/1992 | Keaveney et al. | 106/30 |
| 5,500,023 | 3/1996 | Koike et al. | 8/499 |
| 5,603,735 | 2/1997 | Zimin, Sr. et al. | 8/617 |

FOREIGN PATENT DOCUMENTS

| | | |
|---|---|---|
| 0625552A1 | 11/1994 | European Pat. Off. . |
| 0390729A1 | 10/1990 | France . |
| 2627471A | 1/1977 | Germany . |
| 62244370A | 10/1987 | Japan . |
| 9317166 | 9/1993 | WIPO . |

*Primary Examiner*—Edward J. Cain
*Attorney, Agent, or Firm*—Steven C. Benjamin; Gerald K. White

[57] ABSTRACT

A highly fluid water-based ink composition that comprises a stable oil-in-water emulsion of a water-reducible solvent dye and solvent, preferably citrus solvent, solution homogeneously dispersed as small finely divided dye-containing oil droplets in an aqueous carrier solution containing an emulsion stabilizer of a water-soluble resin. Water-immiscible solvent dyes, including azo, phthalocyanine, and anthraquinone dyes, are mixed with organic solvents and non-ionic surfactants to form emulsifiable water-reducible true solvent dye-containing solutions. The water-reducible solvent dye solutions are stably emulsified as dye-containing oil droplets in aqueous solutions that contain water, water-soluble resins, and optional organic solvent diluents. The stable oil-in-water ink emulsion is suitable to be ejected through ink-jet printer jet nozzles, or through dispensing tips of felt-tip or roller-ball pens, onto a porous substrate, such as paper, to construct a water-fast printed image on the substrate.

20 Claims, No Drawings

STABLE OIL-IN-WATER INK EMULSIONS BASED UPON WATER-REDUCIBLE SOLVENT DYES FOR INK-JET PRINTERS AND FELT-TIP AND ROLLER-BALL PENS

FIELD OF THE INVENTION

The present invention relates to the field of ink compositions, and more particularly to the field of ink compositions useful for ink-jet printing and felt-tip and roller-ball writing. Even more particularly, the present invention relates to aqueous ink compositions that are stable and fluid oil-in-water ink emulsions including finely divided water-reducible solvent dye-containing oil droplets uniformly dispersed in an aqueous stabilizing medium, and to a method of forming indicia on a substrate by ink-jet printing or felt-tip and roller-ball writing using such stable aqueous ink emulsions.

BACKGROUND OF THE INVENTION

Recently, ink-jet printing has taken on greater significance due to the introduction of the personal computer. Most personal computers are attached to ink-jet printers which print readable images stored in the computer memory in a digitized form onto a paper substrate. Ink-jet printing provides a non-contact, pressureless form of printing onto a substrate that has the advantage of including all the information on a printed page in the computer memory without the need for a printing plate.

There are two different types of ink-jet printing processes, continuous and direct ink-jet printing. In continuous ink-jet printing, the principle of operation involves ejecting the ink through a jet nozzle under pressure at very high speeds to form a jet stream, breaking up the jet stream by vibrations to form uniform droplets, some of which will be charged electrostatically, and then deflecting electrostatically charged droplets into a catcher and recirculating them into the ink reservoir, as the remaining uncharged droplets continue in flight to form dots on the printing substrate to construct images. In direct ink-jet printing, commonly referred to as drop-on-demand, the principle of operation involves ejecting the ink under pressure and/or thermal excitement at very high speeds through a small jet nozzle to form uniform droplets which directly impinge on the printing substrate without the creation of an electrostatic field. This way, all ink expelled must go onto the substrate. Most computer printers use drop-on-demand technology which does not involve the use of conductive inks. The present invention generally provides in one aspect non-conductive inks for drop-on-demand ink jet printing operations.

Inks formulated for ink-jet printing must be very fluid, stable, and free of any particles that could cause clogging of the jet nozzles. Also, these inks must be capable of depositing and adhering to the printing substrate with a minimum of character blurring, must be fast drying, and should be permanent with respect to exposure to water. This is also true for inks used in felt-tip and roller-ball writing instruments. A variety of ink formulations have been proposed but have a number of shortcomings.

Ink-jet printing inks as well as inks for writing instruments are generally formulated with soluble dye colorants in a compatible aqueous or solvent-based vehicle to form very fluid, particle-free, dye solutions. Non-aqueous inks have been proposed that contain water-fast, water-immiscible solvent dyes dissolved in volatile organic solvent-based carriers. The use of water-immiscible solvent dyes, especially for ink-jet printing is advantageous, since the solvent dyes have reasonable solubility in volatile organic solvents and, therefore, can be applied as true liquid solutions free of any particles. Another benefit of using solvent dyes in inks is that they tend to be permanent, at least with respect to exposure to water. But one major drawback in their use is that the solvent dyes usually require high amounts of volatile organic solvent carriers, such as xylene, to uniformly dissolve the dyes and provide the primary carrier for the ink.

High amounts of volatile solvents in ink formulations are problematic from both health and environmental standpoints. There is an increasing demand in the printing industry to reduce the amount of volatile organic compounds ("VOC"s) in inks in general. One approach has been to try to formulate water-based inks, such as ink-jet printing inks and inks for writing instruments, without volatile organic solvent carriers. Aqueous inks have been proposed that contain water-soluble dyes. However, the use of water-soluble dyes in inks usually provides an inferior product, since the water-soluble dyes lack water resistance and, accordingly, the printed image has a tendency to bleed when wetted.

Furthermore, aqueous ink formulations, in the past, have tended to exclude the use of water-immiscible organic solvent dyes because of their general inability to form stable dispersions in water. The water-immiscible solvent dyes are hydrophobes and when mixed with water tend to separate or precipitate out of an aqueous mixture. This generally results in the formation of unstable, non-homogeneous, dispersions containing unacceptably large dye particles that can cause clogging in ink-jet printer nozzles as well as in felt-tip and roller-ball pens. Moreover, the agglomerated particles tend form streaks, blots, or other print imperfections on the printed substrate. It would be desirable to formulate aqueous inks containing water-immiscible solvent dyes in order to take advantage of their excellent water-fastness without the accompanying drawbacks of containing harmful volatile organic solvents and forming unstable dispersions.

EP-A-0 625 552 (Morton International, Inc.) published Nov. 23, 1994 and U.S. Pat. No. 5,603,735 (Zimin, Sr. et al), which are both incorporated by reference herein in their entireties, disclose a new class of concentrated water-reducible solvent dye solutions that are claimed to be dispersible in water and infinitely reducible. High loadings of at least 35 wt. % of water-immiscible solvent dyes are mixed with environmentally friendly and physiologically safe citrus solvents, such as, limonene, dipentene, terpene, terpinene, and other citrus solvents derived from citrus peel oils, together with non-ionic surfactants to form water-reducible true dye-containing solutions. An exemplary water-reducible solvent dye solution, as taught in the aforesaid references, includes between about 35 and about 70 wt. % of a) a water-immiscible solvent dye selected from the group of azo type dyes, phthalocyanine type dyes, and anthraquinone type dyes, between about 10 and about 64 wt. % of b) a solvent system to dissolve the dye, the solvent system being between about 30 and about 100 wt. % of $b_1$) at least one citrus solvent and between about 0 to 70 wt. % of $b_2$) at least one additional solvent, which is either water-miscible or water-immiscible, and between about 1 and about 55 wt. % of c) a non-ionic surfactant.

When mixed with water, the water-reducible dye solutions are said to disperse to form aqueous dispersions. The water-reducible form now offers the potential for use of incompatible solvent dyes in water-based ink systems with the advantage of being fast to water and without the accompanying disadvantages of containing substantial amounts of harmful volatile organic solvent carriers. However, in practice, problems have arisen in the use of such water-reducible solvent dyes in water-based ink formulations.

EP-A-0 625 552 and U.S. Pat. No. 5,603,735 suggest a number of possible uses for aqueous ink emulsions based on water-reducible solvent dye solutions, such as inks for felt-tip pens, roller-ball pens, and ink-jets. However, the inks prepared from a mixture of water-reducible solvent dye-containing solutions and water alone, in accordance with their collective teachings, have not be able to perform as good as expected in the field. One problem is that the ink emulsions produced are relatively unstable. Consequently, in a relatively short period of time after mixing, the dispersed solvent dye droplets tend to settle to the bottom of the aqueous mixture, thereby destroying the uniformity of the emulsions. The stratification of the dye droplets requires the ink user to agitate the relatively unstable ink prior to and during use in order to ensure proper emulsification, which is undesirable from a product quality as well as extra time and cost standpoint. Moreover, if the ink has not been adequately reemulsified prior to use, the clumped together solvent dye droplets can cause clogging in ink jet nozzles or in roller-ball rollers and felt-tips of pens. Also, the agglomerated dye droplets can streak, blot, and otherwise mar the quality of the printed indicia on the printing substrate. Substantial efforts are still required in order to provide relatively stable and fluid aqueous ink formulations based on water-reducible, water-immiscible solvent dye solutions.

What is needed is a fluid aqueous ink emulsion based on water-reducible, water-immiscible solvent dyes, for use in ink-jet printers and felt-tip and roller-ball writing instruments, that exhibits much improved emulsion stability.

SUMMARY OF THE INVENTION

It is an object of the present invention, therefore, to provide a stable aqueous ink composition containing a water-reducible, water-immiscible solvent dye for use in ink-jet printers or in felt-tip and roller-ball pens without having the aforesaid disadvantages.

It is another object of the present invention to provide a stable aqueous ink emulsion containing a water-reducible, water-immiscible solvent dye without the use of substantial amounts of harmful organic solvent carriers.

It is still another object of the present invention to provide a stable aqueous ink emulsion containing a water-reducible, water-immiscible solvent dye, that is fast to water when dried.

It is yet another object of the present invention to provide a stable aqueous ink emulsion of a water-reducible, water-immiscible solvent dye-containing citrus solvent solution.

It is yet another object of the present invention to provide a stable oil-in-water ink emulsion of a very fluid nature containing relatively finely divided and uniformly suspended water-reducible, water-immiscible solvent dye-containing oil droplets in an aqueous stabilizing medium.

And still another object of the present invention is to provide an aqueous ink composition usable in ink-jet printers, or a writing instrument ink composition usable in felt-tip and roller-ball pens, that comprises a highly fluid, stable oil-in-water emulsion of a water-reducible, water-immiscible solvent dye-containing citrus solvent solution that is stably emulsified in an aqueous medium containing a water-soluble resin stabilizer, and also that is substantially free of larger solvent dye particle droplets or flocculated droplets that can cause clogging of jet nozzles in ink-jet printers or in dispensing tips of felt-tip and roller-ball pens as well as streaking and blotting on the printed substrate.

It is yet another object of the present invention to provide a method for forming indicia on a substrate by ink-jet printing or felt-tip and roller-ball writing using the aforesaid highly fluid, stable aqueous ink emulsions containing water-reducible, water-immiscible solvent dyes.

These and other objects, features, and advantages of the invention will become apparent from the following description and appended claims.

The present invention provides a stable oil-in-water ink emulsion that is characterized by preferably having: 1) from about 1 to about 15 wt. % of a water-reducible solvent dye solution that includes: a) from about 30 to about 75 wt. %, and preferably from about 35 to about 70 wt. %, of at least one water-immiscible solvent dye selected from the group of azo dyes, phthalocyanine dyes, and anthraquinone dyes; b) from about 10 to about 50 wt. % of a solvent system to dissolve the solvent dye that includes: $b_1$) from about 0 to about 100 wt. %, and preferably from about 30 to about 100 wt. %, of at least one citrus solvent, and $b_2$) from about 0 to about 100 wt. %, and preferably from about 0 to about 70 wt. %, of an additional solvent, which is either water-miscible or water-immiscible; and, c) from about 10 to about 45 wt. % of a non-ionic surfactant; 2) from about 25 to about 90 wt. % of water; 3) from about 0 to about 25 wt. % of at least one water-miscible additional solvent; and, 4) from about 1 to about 55 wt. % of at least one water-soluble resin to maintain the stability of the emulsion, in which component 1) is stably dispersed and emulsified by suitable agitation in components 2)–4), to form a relatively stable, fluid oil-in-water ink emulsions of finely divided and uniformly dispersed solvent dye-containing oil droplets in a stabilizing aqueous medium for use in ink-jet printers and felt-tip and roller-ball pens.

The present invention also provides a method for creating indicia on a paper substrate using the aforesaid stable fluid oil-in-water ink emulsions characterized by the step of ejecting the ink emulsions either through the ink-jet nozzles of ink-jet printers or the dispensing tips of felt-tip and roller-ball pens.

DETAILED DESCRIPTION OF THE PREFERRED EMBODIMENTS OF THE INVENTION

The present invention now provides novel aqueous printing and writing ink compositions that comprise stable emulsions, preferably of the oil-in-water type, of water-immiscible solvent dye-containing solvent solutions, preferably containing citrus solvents, that are infinitely reducible in water and are now able to be stably and uniformly dispersed as finely divided dye droplets in aqueous medium for an extended time. The formation of stable aqueous ink emulsions of the water-reducible solvent dye-containing solutions eliminates the need for substantial amounts of harmful solvent carriers normally used in conjunction with solvent dyes. Also, the use of environmentally friendly and physiologically safe citrus solvents in the solvent dye-containing solutions further reduces the amount of harmful solvents that must be present in the ink emulsions of the invention.

The present invention further provides aqueous ink compositions that are highly fluid and are essentially free of larger dye droplet particles or flocculated dye droplet particles that can clog jet nozzles of ink jet printers as well as the dispensing tips of felt-tip and roller-ball pens. Also, when dried, the aqueous ink emulsions are permanent with respect to exposure to water but resoluble with respect to its own solvent carriers to prevent caking of the ink in the jet nozzles between intermittent spurts of ink jets or in the dispensing tips of the felt-tip and roller-ball pens between usages. The ink emulsions are further capable of depositing and adhering to the printing substrate with a minimum of character fogging or bleeding, and are fast drying without streaking and blotting on the substrate.

The first component included in the stable ink emulsion of the present invention is 1) a water-reducible, water-immiscible solvent dye solution of the kind taught in EP-A-0 625 552 and U.S. Pat. No. 5,603,735 both previously incorporated, or having a composition similar thereto. In particular, the water-reducible solvent dye solution 1) includes a mixture of: a) a water-immiscible solvent dye or mixture of solvent dyes preferably selected from the group of azo dyes, phthalocyanine dyes, and anthraquinone dyes; b) a solvent system for the water-immiscible solvent dye or mixture provided in sufficient quantities to dissolve the dye, the solvent system being either $b_1$) a citrus solvent or mixture of citrus solvents, $b_2$) a compatible, either water-miscible or water-immiscible, solvent or mixture of solvents, or a mixture of both $b_1$) and b2); and c) a non-ionic surfactant. The resultant water-reducible solvent dye solution is dispersible in water and infinitely water reducible.

Water-immiscible solvent dyes are dyes that have at least some solubility in one or more organic solvents, in which solvent the dye may be dissolved and by which the dye may be carried to the substrate. Solvent dyes are completely or substantially immiscible in water. Solvent dyes are discussed more fully in *Colour Index International*, 3rd ed., Additions and Amendments no. 67, April 1988, p. 147–148.

Water-immiscible solvent dyes a) contained in the water-reducible dye solution 1) are of the dye types:

1. Azo dyes which includes monoazo, diazo and tetrazo's of both the metallized and non-metallized varieties. Metallized dyes are typically described as amine salts of monatomic metal chelates with one or two molecules of dye, depending upon the metal used. Non-metallized azo dyes include guanidine salt types typical of the Luxol® product line. Specific examples of water-immiscible azo dyes include, without limitation:
   a. Automate® Black 104=color index (C.I.) Solvent Black 49=benzene azobenzene naphthyl benzene-amino hydroxy, alkyl derivatives/alkylamino-cuprate. CAS #56918.
   b. Automate® Yellow D-C.I. Solvent Yellow, 4-(2-hydroxy-5-nonylphenylazo)-[N-[4-(2-hydroxy-5-nonylphenylazo)-phenyl]] benzamide. CAS #PMN Notice No. P-91-890.
   c. Automate® Red B=C.I. Solvent Red 164=2-naphthalenol (phenylazo) phenyl azo alkyl derivatives. CAS #=TSCA accession #35371.
   d. Morfast® Red 101=C.I. Solvent Red 68=1,3-naphthalenedisulfonic acid, 7-hydroxy-8-4-(phenyl-phenyl azo-, compound with 2-ethyl-N-(2-ethylhexyl)-1-hexanamine (1:2). CAS #68555-82-8.
   e. Morfast® Black 101=C.I. Solvent Black 48=cobaltate bis-2,2'dioxy-4-di 2"-hydroxy-3"-alkyloxy-propyl amino-4-phenylazo-5-methyl-azobenzene, hydrogen dibutanammonium salt.
   f. Luxol® Brown K=C.I. Solvent Brown 20=1,3-naphthalenedisulfonic acid,7,7'(4,6-dihydroxy-1,3-phenylene) bis (azo) bis arylguanidine salt. CAS #72208-28-7.
   g. Automate® Yellow 126-C.I. Solvent Yellow 126=1,3 benzenediol, 2,4-bis (alkyl phenyl) azo-. CAS #s 29190-28-1; 65087-00-5; and 68310-04-3.
   h. C.I. Solvent Brown 52=ferrate bis-2,2'dioxy-4-di 2"-hydroxy-3"alkoxy-propyl amino-5'-chloroazobenzene, hydrogen dibutanammonium salt. CAS #111559-76-3.

2. Phthalocyanine derived dyes, mainly of the sulfonated versions derived from coppered pigments. Specific examples of water-immiscible phthalocyanine dyes include, without limitation:
   a. Morfast® Blue 100=C.I. Solvent Blue 129=cuprate (2-), 29H, 31H phthalocyanine disulfonato (4-) N29, N30, N31, N32 di-1-alkanammonium, -N-(alkyl) salt. CAS #68155-92-0.
   b. Luxol® Blue MBSN=C.I. Solvent Blue 38=cuprate (2-), 29H, 31H-phthalocyaninedisulfonato (4)-N29, N30, N31, N32-arylguanidine salt. CAS # 1328-51-4.

3. Anthraquinones, predominantly, mono-, di- and mixed substituted alkylamino-derivatives as well as mono-, di- and mixed substituted arylamino- types. Specific examples of water-immiscible anthraquinone dyes, include, without limitation:
   a. Automate® Blue 8=C.I. Solvent Blue 98=1,4-dialkylamino anthraquinone. CAS #74499-36-8.
   b. Automate® Green 5=C.I. Solvent Green 5=9,10-anthracenedione, 1,4-bis [(alkylphenyl) amino] anthraquinone. CAS #: none assigned.
   c. BASF's Flussig Blue 672=C.I. Solvent Blue 79=1, 4-dialkoxyamino anthraquinone.

Other solvent dyes, if not of one of the dye types listed above, that can be used in admixture with a dye or dyes of the type(s) mentioned above include, without limitation:
   a. C.I. Solvent Violet 9. CAS #467-63-0.
   b. C.I. Solvent Black 7. CAS #8005-03-5.
   c. C.I. Solvent Blue 100. CAS#71819-50-6.
   d. C.I. Solvent Orange 97. CAS #92257-04-0.
   e. C.I. Solvent Red 49. CAS #509-34-2.

The solvent system b) for the aforesaid solvent dyes preferably includes $b_1$) a citrus solvent. The term "citrus solvent" is used herein inclusively to include chemicals defined as citrus peel oils, terpene, terpinene, and dipentene. The definitions of these classes in Hawley's Condensed Chemical Dictionary, Eleventh Edition overlap:

"Citrus Peel Oils"—Edible oils expressed from the peel or rind of grapefruit, lemon, lime, orange and tangerine; Constituents: limonene, citral, and terpenes in varying percentages.

"Terpene"—$C_{10}H_{16}$—An unsaturated hydrocarbon occurring inmost essential oils and oleoresins of plants. The terpenes are based on the isoprene unit $C_5H_8$, and may be either acyclic or cyclic with one or more benzenoid groups. There are classified as monocyclic (dipentene), dicyclic (pinene) or acyclic myrcene, according to the molecular structure.

"Terpinene"—$C_{10}H_{16}$—A mixture of three isomeric cyclic terpenes, alpha, beta and gamma terpinene.

"Dipentene"—(cinene; limonene, inactive; dl-p-mentha-1,8-diene; cajputene); Commercial form is high in dipentene content, but also contains other terpenes and related compounds in varying amounts.

"Limonene"—a widely distributed optically active terpene, closely related to isoprene. It occurs naturally in both D- and L-forms. The racemic mixture of two isomers is known as dipentene.

Commercial citrus solvent compositions from Ecolink Inc. useful in the present invention have been analyzed as follows:
   a. ATR-C Citrus Solvent. The major component appears to be limonene. The surfactant was identified as a mixture of ethoxylated alkyl phenols with the average structure $C_{12.7}H_{26.4}$-p-$C_6H_4$—O—$(CH_2CH_2$—O$)_7$H. Assuming an average molecular weight of 580, the surfactant was estimated to be approximately 7 wt. % of the sample.

b. Vortex® Citrus Solvent. This sample appears to be very similar to ATR-C. The major component is limonene. The surfactant appears to be a mixture of ethoxylated alkyl phenols.

c. ATR-HI FLASH Citrus Solvent. The major component is terpinolene. The surfactant was identified as an ethoxylated alkyl phenol with an average surface structure $C_{17.7}H_{36.8}$-p-$C_6H_4$—O—$(CH_2CH_2$—O$)_{5.3}$H.

d. ATR-P Citrus Solvent. The NMR spectra of this sample are very complex. The terpenoid component is a complex mixture containing limonene as well as many other components. An ethoxylated surfactant appears to be present at a higher level in this sample. The ethoxylated segment appears to contain some oxymethylene groups. The surfactant may be an ethoxylated alkyl phenol, but due to the complexity of the spectra and the diversity in the structures, positive identification is very difficult. A small carbonyl component, possibly an ester, was also detected in this sample.

e. Dipentene. This sample also appears to be quite complex. The terpenoid solvent contains limonene as well as a number of other components. Its distribution is somewhat similar to that of ATR-P. The surfactant in this sample is similar to that of ATR-P. No carbonyl component was detected.

Citrus solvents are found to be particularly useful solvents in providing dispersions of a wide variety of solvent dyes. In addition, citrus solvents are non-toxic, environmentally safe and biodegradable. The citrus solvent may comprise all of the solvent of the water-reducible dye composition, or may be admixed with a $b_2$) co-solvent, preferably one which is likewise non-toxic and environmentally benign. To reduce the odor of the water-reducible dye solution, the citrus solvent can also be replaced entirely by the co-solvent. Examples of suitable co-solvents include, without limitation, ethyl lactate, butyl lactate, propylene glycol, triethanolamine, methyl ethyl ketone, ethanol, methanol, diethanolamine, methyl lactate, xylene, 1-methoxy-2-propanol, 2-methoxy-1-propanol.

The next component of the water-reducible solvent dye solution 1) is c) a non-ionic surfactant. Suitable examples of non-ionic surfactants include, without limitation, fatty acid esters; polyoxyethylated nonyl phenol derivatives; Rhone Poulenc-Igepal® CO720 and Igepal® CO630 nonylphenoxypoly (ethyleneoxy) ethanol, CAS #9016-45-9; Union Carbide-Tergitol® D-683 alkoxylated alkylphenol, CAS #37251-69-7; Rhone Poulenc-Alkamide 2106 modified coconut diethanolamide, CAS #68603-42-9; Rhone Poulenc-Alkamuls EL-985 polyethoxylated castor oil, CAS #75-21-8; and, Morton International-Sotex® N long chain fatty acid esters, or the like. The non-ionic surfactant assists in the formation of the desired oil-in-water type emulsion.

These water-reducible dye solution components a) to c) are blended together in an effective amount to form a water-reducible true dye solution. As disclosed in EP-A-0 625 552 and U.S. Pat. No. 5,603,735, components a) to c) can be present in a range of: between about 35 and about 70 wt. % of a) a water-immiscible solvent dye or mixtures thereof; between about 10 and about 64 wt. % of b) a solvent system to dissolve the dye, the solvent system, comprising between about 30 and about 100 wt. % of $b_1$) a citrus solvent or mixtures of citrus solvents and between about 0 and about 70 wt. % of $b_2$) an additional solvent or mixture of additional solvents; and, between about I and about 55 wt. % of c) a non-ionic surfactant. As disclosed, the specific solvent dyes discussed above can be loaded in citrus solvent compositions to high levels, i.e., preferably at least about 35 wt % and some up to about 70 wt %. This high dye loading in citrus solvents is unexpected. Moreover, the high dye levels are advantageous in that the industry requires high dye loadings, particularly for dye compositions which will be subsequently diluted by other components of particular formulations.

In the present invention, another suitable range for components a) to c) that is preferred includes: between about 30 and about 75 wt. %, and preferably between about 35 and about 70 wt. %, of a) a water-immiscible solvent dye or mixtures of solvent dyes selected from the group of azo dyes, phthalocyanine dyes, and anthraquinone dyes; between about 10 and about 50 wt. % of b) a solvent system in sufficient quantities to dissolve the solvent dye, the solvent system containing between about 0 and about 100 wt. %, and preferably between about 30 and about 100 wt. %, of $b_1$) a citrus solvent or mixtures of citrus solvent, and between about 0 and about 100 wt. %, and preferably between about 0 and about 70 wt. %, of $b_2$) either water-miscible or water-immiscible additional solvent or mixtures of solvents; and, between about 10 and about 45 wt. % of a c) non-ionic surfactant. The aforesaid ranges are merely exemplary and other ranges will become apparent from the practice of the present invention.

The true dye-containing solution is typically provided free of water for shipment and storage. The end user will take the concentrated dye solution and add it to water to produce an aqueous dispersion of the dye solution. However, until the present invention, it has not been possible in practice to create sufficiently stable aqueous ink dispersions usable in ink-jet printers and felt-tip and roller-ball writing instruments. The current inventor realized that the dye-containing droplets tended to rapidly settle out and agglomerate in water, which is undesirable for ink formulations. Therefore, the present invention now includes an aqueous stabilizing medium for the water-reducible dye solutions that is used to adequately create and maintain finely divided solvent dye-containing oil droplets stably and uniformly in an oil-in-water ink emulsion. The components recited hereinafter produce the stable oil-in-water emulsions of the present invention.

The next component that is included in the stable ink emulsion of the present invention is 2) water to effect emulsification of the dye solution. In the present invention, the aqueous ink emulsion that is formed is most preferably a very fluid oil-in-water emulsion of uniformly dispersed and finely divided solvent dye-containing oil droplets. The term "oil-in-water emulsion" refers to an emulsion system in which water-reducible solvent dye-containing oil droplets are dispersed in a continuous aqueous phase. The mere presence of water, however, as previously discussed, is not enough to form a stable oil-in-water emulsion of the dye droplets having the desired properties for ink-jet printing and felt-tip and roller-ball writing applications. Accordingly, other components must be included such that the aqueous ink emulsion containing the solvent dye has properties similar to inks composed of homogeneous, particle-free, dye solutions normally used for such applications.

The next component that can be included in the stable ink emulsion of the present invention is 3) a compatible, preferably water-miscible, co-solvent. The co-solvent is preferably one which is likewise non-toxic and environmentally benign. The water-miscible organic solvent serves as a diluent. Examples of suitable aqueous organic co-solvents include, without limitation, ethanol, n-propanol, m-pyrol (n-methyl-2-pyrrolidinone), triethanolamine, propylene glycol, and diethylene glycol. Other co-solvents, including those previously disclosed herein, can also be used so long as they are compatible with the water-soluble resin component described hereinafter. Care must be taken not to use too much co-solvent which may invert the emulsion.

The next component that is included in the stable ink emulsion of the present invention is 4) a water-soluble resin. This resin serves a dual function. It is used as a film-forming binder for aiding in the fixing of the solvent dye colorant to the substrate that is to be printed. The resin is also used to enhance the stability of the ink emulsion by providing sufficient thickening action to the aqueous system. In this way, the resin keeps the solvent dye-containing oil droplets uniformly suspended and dispersed in the aqueous phase for extended times and prevents the settling of the dye droplets, thereby increasing the stability and pot life of the ink emulsion.

A wide variety of water-soluble resins can be used in the practice of this invention, including synthetic, semi-synthetic, and natural resin polymers. The resins used are preferably non-drying resins. The term "non-drying resins" refers to resins that form films only upon evaporation of the solvent, without oxidation, polymerization, or other molecular change taking place. These non-drying resins do not contain drying oils.

Examples of suitable water-soluble resins for use in the present invention, include, without limitation, cellulose derivatives, such as methyl cellulose, methyl hydroxyethyl cellulose, methyl hydroxypropyl cellulose, hydroxyethyl cellulose, hydroxypropyl cellulose, and carboxymethyl methyl cellulose, styrene polymers and copolymers, such as styrene-acrylic copolymers, polyvinyl polymers and copolymers, such as polyvinyl alcohol, polyvinyl pyrrolidone, and poly (n-vinyl-2-pyrrolidone) homopolymers, acrylic polymers and copolymers, polysaccharides, and like water-soluble resins. Of these water-soluble polymers, polyvinyl pyrrolidones, styrene-acrylics, and acrylics are especially preferred.

The components 1) to 4) are blended together in an effective amount to form a very fluid aqueous ink emulsion containing the finely divided solvent dye-containing oil droplets uniformly and stably dispersed in the aqueous stabilizing medium. Components 1) to 4) can be present in the ink emulsion in the preferred range: between about 1 and about 15 wt. %, preferably between about 3 and about 12 wt. %, of 1) a water-reducible solvent dye solution; between about 25 and about 95 wt. %, preferably between about 45 and about 90 wt. %, of 2) water; between about 0 and about 25 wt. %, preferably between about 3 and 20 wt. %, of 3) an additional, preferably water-miscible, solvent diluent or mixture of solvent diluents; and, between about 1 and about 55 wt. %, preferably between about 5 and about 35 wt. %, of 4) an emulsion stabilizer comprising a water-soluble resin or mixture of water-soluble resins, based on the total weight of the ink emulsion. The aforesaid ranges are merely exemplary and other ranges will become apparent from the practice of the invention.

In accordance with the present invention, other common ink additives can be included in the ink emulsions, such as pH adjusters, rheology modifiers, antioxidants, thixotropic agents, plasticizers, conductive agents, such as salts, and the like.

In one exemplary method used to form the stable oil-in-water ink emulsion containing a water-immiscible solvent dye, the water-reducible solvent dye-containing solution component 1) is emulsified through the addition, under agitation, with the water component 2). This is followed by the addition of components 3) and 4) to the admixture under continued agitation. The water reducible dye solution is thus stably dispersed in an aqueous solution as fine droplet particles. The dispersion is properly agitated to homogeneously disperse the water-reducible dye-containing oil droplets in the aqueous solution and produce a fluid and stable oil-in-water ink emulsion. Heating up to about 122° F. can be used to help disperse the dye droplets. The ink emulsion is finally filtered through a mesh screen or filter paper, preferably having between 1 and 5 μm pore size, to separate out any residual larger dye droplets from the desired smaller droplets. Other methods for forming the stable water-in-oil ink emulsion should be apparent from the aforesaid description and following examples.

The ink emulsions of the invention are readily printed onto porous substrates, especially paper, through ink-jet nozzles of drop-on-demand ink-jet printers as well as through the dispensing tips of felt-tip and roller-ball pens. Of course, non-porous substrates, for example, UV coated stock, acetate film, and the like, can be printed upon with the ink emulsion of the present invention given a proper amount of resin to allow for the necessary adhesion. The substrate to be printed upon is preferably porous, since the ink emulsions of the invention mainly dry by absorption of the ink fluid into the pores of the substrate, to form a water-fast dry solvent dye film on the surface of the substrate. Drying can be accelerated by evaporation of the ink fluid. Examples of suitable printable porous substrates for the ink emulsions of the invention include, without limitation, paper, cardstock, corrugated cardboard, and the like.

It is desired that an ink emulsion thus produced has the final properties as identified in the Table below.

| Final Ink Emulsion Properties | | |
|---|---|---|
| Property | General Range | Preferred Range |
| Viscosity (cP) | 3 to 15 | 3 to 8 |
| Dye Droplet Size (μm in dia) | 1 to 10 | <1 to 2 |
| pH | 6 to 9 | 6.5 to 8 |
| Drying Time In Air (min) | 1 to 3 | <1 |
| Resolubility Upon Itself | Good to Excellent | Excellent |
| Water-fastness | Good to Excellent | Excellent |
| Emulsion Stability (Shelf-Life) | At Least 1 Month | At Least 6 Months to 1 Year |

The invention will be further clarified by a consideration of the following non-limiting Examples, which are intended to be purely exemplary of the invention. Unless otherwise stated herein, the parts and percentages are by weight.

EXAMPLE 1

Aqueous Ink-Jet Ink Emulsion Based On Aquamate® Yellow 20143 Solvent Dye

The ingredients of the yellow ink-jet emulsion of Example 1 are listed in Table 1 below.

TABLE 1

| Ingredients | Parts By Weight | |
|---|---|---|
| n-Propanol | | 10.0 |
| n-Methyl-2-Pyrrolidinone | | 10.0 |
| Aquamate ® Yellow 20143 Water-Reducible Dye Solution = | | 5.0 |
|     Automate ® Yellow 126[1] | 68.0 | |
|     Dipentene Citrus Solvent | 17.0 | |
|     Igepal ® CO720[2] | 15.0 | |
|     Total | 100.0 | |
| Lucidene ® 604 Resin[3] | | 50.0 |
| Water | | 25.0 |
| Total | | 100.0 |

[1]Automate ® Yellow 126 or C.I. Solvent Yellow 126 is a 1,3-benzenediol-2,4-bis (alkyl phenyl) azo-dye. Only the non-volatile dye portion is used with the normal solvent first being distilled out, if provided in solvent solution. CAS No. 29190-28-1, 65087-00-5, and 68310-04-3. Morton International.
[2]Igepal ® CO720 is a non-ionic surfactant of nonylphenoxypoly (ethyleneoxy) ethanol. CAS #9016-45-9. Rhone Poulenc.
[3]Lucidene ® 604 Resin is a styrene-acrylic copolymer resin. Morton International.

The yellow ink-jet emulsion was prepared by mixing together at room temperature the above-ingredients listed in Table 1 in the order given while slowly stirring with a magnetic stirrer. Stirring was continued for about 1 hour. The yellow ink emulsion was then filtered to have a dye droplet size of less than about 3 $\mu$m. The yellow ink emulsion had a pH of about 8, a viscosity of about 10 centipoise (cP) at 22° C., a drying time of less than about 1 minute, and a shelf life of at least about 3 months or greater. The ink emulsion was satisfactorily printed onto a paper substrate through an ink-jet printer, and the dried printed indicia had good resolution and excellent water-fastness.

EXAMPLE 2

Aqueous Ink-Jet Ink Emulsion Based On Aquamate® Yellow 20161 Solvent Dye

The ingredients of the yellow ink-jet emulsion of Example 2 are listed in Table 2.

TABLE 2

| Ingredients | Parts By Weight | |
|---|---|---|
| M-pyrol | | 10.0 |
| Ethanol | | 10.0 |
| Aquamate ® Yellow 20161 Water-Reducible Dye Solution = | | 4.0 |
|     Automate ® Yellow 126 | 68.0 | |
|     M-pyrol | 17.0 | |
|     Igepal ® CO720[2] | 15.0 | |
|     Total | 100.0 | |
| Lucidene ® 604 Resin | | 8.0 |
| Water | | 68.0 |
| Total | | 100.0 |

The yellow ink-jet emulsion was prepared by mixing together at room temperature the above-ingredients listed in Table 2 in the order given while slowly stirring with a magnetic stirrer. Stirring was continued for about 1 hour. The yellow ink emulsion was then filtered to have a dye droplet size of less than about 3 $\mu$m. The yellow ink emulsion had a pH of about 7.5, a viscosity of about 8 cP at 23° C., a drying time of less than about 1 minute, and a shelf life of at least about 3 months or greater. The ink emulsion was satisfactorily printed onto a paper substrate through an ink-jet printer, and the dried printed indicia had good resolution and excellent water-fastness.

EXAMPLE 3

Aqueous Felt-Tip Highlighter Ink Emulsion Based On Aquamate® Yellow 20161 Solvent Dye The ingredients of the yellow highlighter pen ink emulsion of Example 3 are listed in Table 3 below.

TABLE 3

| Ingredients | Parts By Weight | |
|---|---|---|
| M-pyrol | | 4.0 |
| Ethanol | | 6.0 |
| Aquamate ® Yellow 20161 Water-Reducible Dye Solution = | | 4.0 |
|     Automate ® Yellow 126 | 68.0 | |
|     M-pyrol | 17.0 | |
|     Igepal ® CO720 | 15.0 | |
|     Total | 100.0 | |
| Lucidene ® 604 Resin | | 14.6 |
| Water | | 71.4 |
| Total | | 100.0 |

The yellow felt-tip highlighter ink emulsion was prepared by mixing together at room temperature the above-ingredients listed in Table 3 in the order given while slowly stirring with a magnetic stirrer. Stirring was continued for about 1 hour. The yellow ink emulsion was then filtered to have a dye droplet size of less than about 3 $\mu$m. The yellow ink emulsion had a pH of about 7.5, a viscosity of about 10 cP at 24° C., a drying time of less than about 1 minute, and a shelf life of at least 3 months or greater. The ink emulsion was satisfactorily dispensed from the tip of a felt-tip pen onto a paper substrate and the dried printed indicia had excellent water-fastness.

EXAMPLE 4

Aqueous Ink-Jet Ink Emulsion Based On Aquamate® Blue 20123 Solvent Dye

The ingredients of the blue ink-jet emulsion of Example 4 are listed in Table 4 below.

TABLE 4

| Ingredients | Parts By Weight | |
|---|---|---|
| n-Propanol | | 10.0 |
| n-Methyl-2-Pyrrolidone | | 10.0 |
| Aquamate ® Blue 20123 Water-Reducible Dye Solution = | | 5.0 |
|     Automate ® Yellow 126 | 68.0 | |
|     M-pyrol | 17.0 | |
|     Igepal ® CO720[2] | 15.0 | |
|     Total | 100.0 | |
| Lucidene ® 604 Resin | | 25.0 |
| Water | | 50.0 |
| Total | | 100.0 |

[1]Automate ® Blue 8 or C.I. Solvent Blue 98 is a 1,3-diakylamino anthraquinone dye using only the non-volatile dye portion. CAS. No. 74499-36-8. Morton International.
[2]Sortex N ® is a non-ionic surfactant of long chain fatty acid esters. Morton International.

The blue ink-jet emulsion was prepared by mixing together at room temperature the above-ingredients listed in Table 4 in the order given while slowly stirring with a magnetic stirrer. Stirring was continued for about 1 hour. The blue ink emulsion was then filtered to have a dye droplet size of less than about 1 $\mu$m. The blue ink emulsion had a pH of about 7.8, a viscosity of about 9 cP at 22° C., a drying time of less than about 1 minute, and a shelf life of at least about 8 months or greater. The ink emulsion was satisfactorily printed onto a paper substrate through an ink-jet printer, and the dried printed indicia had good resolution and excellent water-fastness.

EXAMPLE 5

Aqueous Ink-Jet Ink Emulsion Based On Aquamate® Blue 20136 Solvent Dye

The ingredients of the blue ink-jet emulsion of Example 5 are listed in Table 5 below.

TABLE 5

| Ingredients | | Parts By Weight | |
|---|---|---|---|
| PVP Resin[1] | | 10.0 | |
| Lucidene ® 400 Resin[2] | | 10.0 | |
| Water | | | |
| Aquamate ® Blue 20136 Water-Reducible Dye Solution = | | 5.0 | |
| | Automate ® Yellow 126 | 68.0 | |
| | M-pyrol | 17.0 | |
| | Igepal ® CO720[2] | 15.0 | 25.0 |
| | Total | 100.0 | 50.0 |
| Lucidene ® 604 Resin | | | 100.0 |
| Water | | | |
| Total | | | |

The blue ink-jet emulsion was prepared by mixing together at room temperature the above-ingredients listed in Table 5 in the order given while slowly stirring with a magnetic stirrer. Stirring was continued for about 1 hour. The blue ink emulsion was then filtered to have a dye droplet size of less than about 1 μm. The blue ink emulsion had a pH of about 7.5, a viscosity of about 15 cP at 22° C., a drying time of less than about 1 minute, and a shelf life of at least about 1–2 months or greater. The ink emulsion was satisfactorily printed onto a paper substrate through an ink-jet printer and the dried printed indicia had good resolution and excellent water-fastness.

EXAMPLE 6

Aqueous Felt-Tip Highlighter Ink Emulsion Based On Aquamate® Blue 20136 Solvent Dye The ingredients of the blue ink-jet emulsion of Example 6 are listed in Table 6 below.

TABLE 6

| Ingredients | | Parts By Weight | |
|---|---|---|---|
| M-pyrol | | 5.0 | |
| Aquamate ® Blue 20136 Water-Reducible Dye Solution = | | 5.0 | |
| | Morfast ® Blue 100 | 30.0 | |
| | Vortex Citrus Solvent | 20.0 | |
| | Sortex N ® | 40.0 | |
| | Total | 100.0 | |
| Lucidene ® 604 Resin | | | 50.0 |
| Water | | | 25.0 |
| Total | | | 100.0 |

The blue felt-tip highlighter ink emulsion was prepared by mixing together at room temperature the above-ingredients listed in Table 6 in the order given while slowly stirring with a magnetic stirrer. Stirring was continued for about 1 hour. The blue ink emulsion was then filtered to have a dye droplet size of less than about 1 μm. The blue ink emulsion had a pH of about 7.5, a viscosity of about 10 cP at 24° C., a drying time of less than about 1 minute, and a shelf life less than 2 months. The ink emulsion was satisfactorily dispensed from the tip of a felt-tip pen onto a paper substrate, and the dried printed indicia had good water-fastness.

EXAMPLE 7

Aqueous Ink-Jet Ink Emulsion Based On Aquamate® Red 20134 Solvent Dye

The ingredients of the red ink-jet emulsion of Example 7 are listed in Table 7 below.

TABLE 7

| Ingredients | | Parts By Weight | |
|---|---|---|---|
| n-Propanol | | 10.0 | |
| n-Methyl-2-Pyrrolidinone | | 10.0 | |
| Aquamate ® Red 20134 Water-Reducible Solution = | | 5.0 | |
| | Automate ® Red B[1] | 35.0 | |
| | Dipentene Citrus Solvent | 39.0 | |
| | Igepal ® CO720 | 26.0 | |
| | Total | 100.0 | |
| Lucidene ® 604 Resin | | | 25.0 |
| Water | | | 50.0 |
| Total | | | 100.0 |

[1]Automate ® Red or C.I. Solvent Red 164 is a 2-naphthalenol (phenylazo) phenyl azo alkyl derivative dye using only the non-volatile dye portion.
CAS No. = TSCA Accession No. 35371. Morton International.

The red ink-jet emulsion was prepared by mixing together at room temperature the above-ingredients listed in Table 7 in the order given while slowly stirring with a magnetic stirrer. Stirring was continued for about 1 hour. The red ink emulsion was then filtered to have a dye droplet size of less than about 1 μm. The red ink emulsion had a pH of about 8, a viscosity of about 10 cP at 22° C., a drying time of less than about 1 minute, and a shelf life of at least 8 months or greater. The ink emulsion was satisfactorily printed onto a paper substrate through an ink-jet printer, and the dried printed indicia had good resolution and excellent water-fastness.

EXAMPLE 8

Aqueous Ink-Jet Ink Emulsion Based On Aquamate® Red 20135 Solvent Dye

The ingredients of the red ink-jet emulsion of Example 8 are listed in Table 8 below.

TABLE 8

| Ingredients | | Parts By Weight | |
|---|---|---|---|
| n-Propanol | | 12.0 | |
| n-Methyl-2-Pyrrolidinone | | 8.0 | |
| Aquamate ® Red 20135 Water-Reducible Solution = | | 5.0 | |
| | Morfast ® Red 101[1] | 50.0 | |
| | Dipentene Citrus Solvent | 10.0 | |
| | Sortex N ® | 40.0 | |
| | Total | 100.0 | |
| Lucidene ® 604 Resin | | | 50.0 |
| Water | | | 25.0 |
| Total | | | 100.0 |

[1]Morfast ® Red 101 or C.I. Solvent Red 68 is a 1,3-naphthalenedisulfonic acid, 7-hydroxy-8-4-(phenyl azo) phenyl azo-compound with 2-ethyl-N-(2-ethylhexyl)-1-hexanamine (1:2) dye using only the non-volatile dye portion. CAS No. 68555-82-8. Morton International.

The red ink-jet emulsion was prepared by mixing together at room temperature the above-ingredients listed in Table 8 in the order given while slowly stirring with a magnetic stirrer. Stirring was continued for about 1 hour. The red ink emulsion was then filtered to have a dye droplet size of less than about 1 μm. The red ink emulsion was satisfactorily printed onto a paper substrate through an ink-jet printer, and the dried printed indicia had good resolution and excellent water-fastness.

EXAMPLE 9

Aqueous Ink-Jet Ink Emulsion Based On Aquamate® Red 20134 Solvent Dye

The ingredients of the red inkjet emulsion of Example 9 are listed in Table 9 below.

TABLE 9

| Ingredients | | Parts By Weight | |
|---|---|---|---|
| Water | | | 82.0 |
| Aquamate ® Red 20134 Water-Reducible Solution = | | | 12.8 |
| | Automate ® Red B¹ | 35.0 | |
| | Dipentene Citrus Solvent | 39.0 | |
| | Igepal ® CO720 | 26.0 | |
| | Total | 100.0 | |
| Lucidene ® 400 Resin | | | 5.2 |
| Total | | | 100.0 |

The red ink-jet emulsion was prepared by mixing together at room temperature the above-ingredients listed in Table 9 in the order given while slowly stirring with a magnetic stirrer. Stirring was continued for about 1 hour. The red ink emulsion was then filtered to have a dye droplet size of less than about 1 μm. The red ink emulsion had a pH of about 7.5, a viscosity of about 10 cP at 22° C., a drying time of less than about 1 minute, and a shelf life of at least 2 months or greater. The ink emulsion was satisfactorily printed onto a paper substrate through an ink-jet printer, and the dried printed indicia had good resolution and excellent water-fastness.

EXAMPLE 10

Aqueous Roller-Ball Ink Emulsion Based On Aquamate® Red 20134 Solvent Dye

The ingredients of the red ink-jet emulsion of Example 10 are listed in Table 10 below.

TABLE 10

| Ingredients | | Parts By Weight | |
|---|---|---|---|
| Water | | | 65.0 |
| Aquamate ® Red 20134 Water-Reducible Solution = | | | 12.0 |
| | Automate ® Red B¹ | 35.0 | |
| | Dipentene Citrus Solvent | 39.0 | |
| | Igepal ® CO720 | 26.0 | |
| | Total | 100.0 | |
| Lucidene ® 604 Resin | | | 23.0 |
| Total | | | 100.0 |

The red roller-ball pen ink emulsion was prepared by mixing together at room temperature the above-ingredients listed in Table 10 in the order given while slowly stirring with a magnetic stirrer. Stirring was continued for about 1 hour. The red ink emulsion was then filtered to have a dye droplet size of less than about 1 μm. The red ink emulsion had a pH of about 8, a viscosity of about 11 cP at 24° C., a drying time of less than about 1 minute, and a shelf life of at least 3 months or greater. The ink emulsion was satisfactorily dispensed through the roller ball tip of a roller-ball pen onto a paper substrate, and the dried printed indicia had good resolution and excellent water-fastness.

The invention having been disclosed in the foregoing embodiments and examples, other embodiments of the invention will be apparent to persons skilled in the art. The invention is not intended to be limited to the embodiments and examples disclosed, which are considered to be exemplary only. Accordingly, reference should be made to the appended claims to asses the true spirit and scope of the invention, in which exclusive rights are claimed.

The subject matter claimed is:

1. A stable aqueous ink emulsion based on a water-immiscible solvent dye, which comprises:

between about 1 and about 15 wt. % based on said emulsion of a water-reducible solvent dye-containing solution, said water-reducible solvent dye-containing solution comprising:

between about 30 and about 75 wt. % based on said dye-containing solution of at least one water-immiscible solvent dye selected from the group consisting of azo dyes, phthalocyanine dyes, and anthraquinone dyes;

between about 10 and about 50 wt. % based on said dye-containing solution of a solvent system, said solvent system comprising:

between about 0 and about 100 wt. % based on said solvent system of at least one citrus solvent; and, between about 0 and about 100 wt. % based on said solvent system of at least one first organic solvent; and, between about 10 and about 45 wt. % based on said dye-containing solution of at least one non-ionic surfactant;

between about 25 and about 90 wt. % based on said emulsion of water;

between about 0 and about 25 wt. % based on said emulsion of at least one second organic solvent; and, between about 1 and about 55 wt. % based on said emulsion of at least one water-soluble resin, wherein after said aqueous ink emulsion is dried, said water-soluble resin is resoluble with respect to said aqueous ink emulsion.

2. The ink emulsion of claim 1, in which said emulsion is an oil-in-water emulsion having said dye-containing solution forming oil droplets dispersed in the aqueous phase.

3. The ink emulsion of claim 2, in which said emulsion is highly fluid having a viscosity of between about 3 and about 15 cP at ambient temperature.

4. The ink emulsion of claim 2, in which said emulsion forms finely divided dye-containing solution oil droplets having an average particle size of between about 1 and 10 microns uniformly dispersed in the aqueous phase.

5. The ink emulsion of claim 2, in which said at least one water-soluble resin is selected from the group consisting of cellulosics, styrenes, polyvinyls, acrylics, styrene-acrylics, and polysaccharides.

6. The ink emulsion of claim 2, in which said at least one water-soluble resin is selected from the group consisting of vinyl pyrrolidone polymers, styrene-acrylic polymers, and acrylic polymers.

7. The ink emulsion of claim 2, in which said at least one citrus solvent is selected from the group consisting of citrus peel oils, limonene, dipentene, terpene, terpinene, pinene, myrecene, terpinolene, and citral.

8. The ink emulsion of claim 2, in which said at least one citrus solvent is derived form citrus peel oils.

9. The ink emulsion of claim 2, in which said non-ionic surfactant is selected from the group consisting of long chain fatty acid esters, polyoxyethylated nonylphenols, alkoxylated alkylphenols, coconut diethanolamides, and polyethoxylated castor oils.

10. The ink emulsion of claim 2, in which said non-ionic surfactant comprises nonylphenoxypoly (ethyleneoxy) ethanol.

11. An ink-jet printer which contains said ink emulsion of claim 2.

12. A felt-tip pen which contains said ink emulsion of claim 2.

13. A roller-ball pen ink which contains said ink emulsion of claim 2.

14. The ink emulsion of claim 2, which comprises:
   between about 3 and about 12 wt. % based on said emulsion of said water-reducible solvent dye-containing solution, said water-reducible solvent dye-containing solution comprising:
      between about 35 and about 70 wt. % based on said dye-containing solution of said least one water-immiscible solvent dye;
      between about 10 and about 50 wt. % based on said dye-containing solution of said solvent system, said solvent system comprising:
         between about 30 and about 100 wt. % based on said solvent system of said at least one citrus solvent; and,
         between about 0 and about 70 wt. % based on said solvent system of said at least one first organic solvent; and,
      between about 10 and about 45 wt. % based on said dye-containing solution of said at least one non-ionic surfactant;
   between about 45 and about 90 wt. % based on said emulsion of said water;
   between about 3 and about 20 wt. % based on said emulsion of said at least one second organic solvent; and,
   between about 5 and about 35 wt. % based on said emulsion of at said least one water-soluble resin.

15. A stable oil-in-water ink emulsion, which comprises:
   a water-reducible, water-immiscible solvent dye-containing solution including a water-immiscible solvent dye selected from the group consisting of azo dyes, phthalocyanine dyes, and anthraquinone dyes, an effective amount of an organic solvent to dissolve said dye, and an effective amount of a non-ionic surfactant to create a water-in-oil emulsion upon the addition of water;
   water in an effective amount to effect emulsification; and,
   a water-soluble resin in an effective amount to sufficiently maintain finely divided droplets of said dye-containing solution uniformly dispersed in the aqueous phase, wherein after said oil-in-water ink emulsion is dried, said water-soluble resin is resoluble with respect to said ink emulsion.

16. The emulsion of claim 15, in which said solvent for said dye comprises at least one citrus solvent.

17. A method for forming water-fast indicia on a porous substrate with a stable aqueous ink emulsion based on a water-immiscible solvent dye, which comprises:
   providing a porous substrate to be printed upon;
   providing a substantially stable, fluid, and water-fast aqueous ink emulsion comprising:
      between about 1 and about 15 wt. % based on said emulsion of a water-reducible solvent dye-containing solution, said water-reducible solvent dye-containing solution comprising:
         between about 30 and about 70 wt. % based on said dye-containing solution of at least one water-immiscible solvent dye selected from the group consisting of azo dyes, phthalocyanine dyes, and anthraquinone dyes;
         between about 10 and about 50 wt. % based on said dye-containing solution of a solvent system, said solvent system comprising:
            between about 0 and about 100 wt. % based on said solvent system of at least one citrus solvent; and,
            between about 0 and about 100 wt. % based on said solvent system of at least one first organic solvent; and,
         between about 10 and about 45 wt. % based on said dye-containing solution of at least one non-ionic surfactant;
      between about 25 and about 90 wt. % based on said emulsion of water;
      between about 0 and about 25 wt. % based on said emulsion of at least one second organic solvent; and,
      between about 1 and about 55 wt. % based on said emulsion of at least one water-soluble resin; and,
   ejecting said ink emulsion in a pattern from an ink reservoir containing said ink emulsion through a dispenser of a printing instrument onto said porous substrate to form printed indicia thereon; and,
   allowing said printed indicia to dry and fix on said substrate.

18. The method of claim 17, in which said printing instrument is an ink-jet printer.

19. The method of claim 17, in which said printing instrument is a roller-ball pen.

20. The method of claim 17, in which said printing instrument is a felt-tip pen.

* * * * *